United States Patent [19]

Sempio et al.

[11] Patent Number: 4,822,652
[45] Date of Patent: Apr. 18, 1989

[54] SANITARY WARES OF ACRYLIC OR METHACRYLIC RESINS AND METHOD FOR OBTAINING THEM

[75] Inventors: Carlo Sempio; Romeo Vailati, both of Busto Arsizio; Tullo Ronchetti, Milan, all of Italy

[73] Assignee: Vedril S.p.A., Milan, Italy

[21] Appl. No.: 931,048

[22] Filed: Nov. 17, 1986

[30] Foreign Application Priority Data

Nov. 22, 1985 [IT] Italy ................................ 22956 A/85

[51] Int. Cl.$^4$ ........................ B32B 3/26; B32B 27/08; B32B 27/30; B32B 27/36
[52] U.S. Cl. ...................................... 428/34.5; 4/584; 264/46.8; 428/317.5; 428/317.9; 428/319.3; 428/319.7
[58] Field of Search ................... 4/538, 584, 596, 612, 4/613, 619; 428/35, 317.5, 317.9, 319.3, 319.7; 264/46.8

[56] References Cited

U.S. PATENT DOCUMENTS

| | | | |
|---|---|---|---|
| 4,220,683 | 9/1980 | Barker et al. | 428/35 |
| 4,235,948 | 11/1980 | Holmes | 428/35 |
| 4,538,311 | 9/1985 | Hall et al. | 4/584 |

FOREIGN PATENT DOCUMENTS

| | | | |
|---|---|---|---|
| 0034678 | 2/1981 | European Pat. Off. | |
| 2839149 | 3/1980 | Fed. Rep. of Germany | 4/584 |
| 60-33504 | 8/1985 | Japan | 4/584 |
| 904763 | 8/1962 | United Kingdom | 428/35 |
| 2019313 | 10/1979 | United Kingdom | 428/317.5 |
| 2148786 | 6/1985 | United Kingdom | 428/319.7 |
| 2171008 | 8/1986 | United Kingdom | |

*Primary Examiner*—William J. Van Balen
*Attorney, Agent, or Firm*—Stevens, Davis, Miller & Mosher

[57] ABSTRACT

The present invention relates to sanitary wares of acrylic or methacrylic resins, such as bathtubs, shower trays, sinks, and so forth, comprising a sheet of thermoformed resin and a reinforcing layer of fiberglass-filled foamed unsaturated polyester.

7 Claims, No Drawings

SANITARY WARES OF ACRYLIC OR METHACRYLIC RESINS AND METHOD FOR OBTAINING THEM

The present invention relates to sanitary wares of acrylic or methacrylic resins, and to the method for obtaining them.

By the term "sanitary wares", as it is used in the instant disclosure and in the appended claims, bathtubs, shower trays, sinks, bidets, etc., are meant.

BACKGROUND OF THE INVENTION

Sanitary wares of thermoformed polymethylmethacrylate reinforced with compact polyester filled with fiberglass are known on the market, but the preparation of such articles shows some disadvantages, which can be summarized as follows:

(a) the need to carry out compacting and rolling operations, with heavy increase of production costs, on the manufactured items, in order to obtain reinforcing layers free from cavities and to orient the fiberglass in a parallel arrangement to the surface of the same manufactured item; such cavities, as known, compromise the stiffness of the item, and its resistance to temperature cycles;

(b) impossibility of automating the rolling and compacting process with very high costs, which cannot be borne by these types of products, because of the strong differences in shape and size of the articles produced;

(c) hygienic-sanitary problems deriving from the need of operating manually and with consequent possibility of the operators breathing vapors of monomers during the course of the operations.

THE PRESENT INVENTION

We have now found that sanitary wares of acrylic or methacrylic resin which do not display the above mentioned drawbacks are those constituted by a thermoformed resin sheet and by a reinforcing layer of fiberglass-filled foamed unsaturated polyester.

The thermoformed resin sheet is preferably constituted by polymethylmethacrylate, and in the reinforcement layer the fiberglass/polyester ratio is comprised within the range of from 10/90 to 40/60, and preferably of from 15/85 to 25/75.

A further object of the present invention is the method for obtaining the sanitary wares of acrylic or methacrylic resin having a reinforcement layer of fiberglass-filled foamed unsaturated polyester, by means of which it is possible to avoid the rolling and compacting operations, as well as obtaining items considerably improved from the viewpoint of the surface finishing, of the weight and of the heat insulation.

Our method is based on the use of polyester resins which foam up on hardening, and assume a compact shape with no need of manual rolling operations, and which are applied by spraying on the back of the sheet of thermoformed resin. This allows the time required for carrying out the reinforcing operation to be reduced by about 50% in the spraying and compacting steps, and by about 75% during the hardening.

The spraying operation can be carried out in a completely automatic form, without any action by attending personnel, or inside rooms where people are absent, with evident advantages of a technical-economic and hygienic character.

According to a preferred form of practical embodiment, the method of the present invention comprises:
(1) a sheet heating step;
(2) a thermoforming step;
(3) a spraying step for the application of the reinforcing layer;
(4) a hardening step; and
(5) a trimming step.

The method of this invention is essentially based on the use of polyester resins chemically foamed by means of additives and catalysts. All the types of unsaturated polyester resins suitable for use with fiberglass can be used in the present method, such as, e.g., resins based on maleic anhydride, based on phthalic acid anhydride, based on fumaric acid, tetrahydrophthalic acid, hexahydrophthalic acid, diallylphthalate, and so forth. To them, foaming agents, catalysts, and accelerators/inhibitors are added, according to the technology used in this field.

The preferred expander agent is constituted by tert.-butyl-hydrazine chloride blended with iron-(III) chloride, marketed under the tradename LUPERFOAM 239 by PENNWALT, LUCIDOL Divison (Buffalo, N.Y.). It is mixed with the resins before the spraying in an amount of 0.5–4%, preferably of 1–1.5% by weight.

The catalyst is of the type of organic peroxides, such as the peroxides used for the crosslinking of the polyester resins; in particular, it is selected from among the peroxides of aliphatic and alicyclic ketones, diacylperoxides, hydroperoxides, peroxyesters, perketals, dialkylperoxides, such as, e.g., methylethylketone peroxide, cyclohexanone peroxide, benzoylperoxide, cumyl hydroperoxide, tert.butyl-peroxybenzoate, dicumylperoxide, and so forth. A preferred catalyst is constituted by a mixture of peroxyesters marketed under the tradename LUPEROX DP 33, manufactured by PENNWALT. Such catalysts are used at a level of 1–5%, preferably of about 3% by weight relatively to the resin, and are added at the time of the spraying operation.

The accelerator/inhibitor system is used for the purpose of facilitating the hardening of the resin within predetermined times, which can range from 30 seconds to 20 minutes. The accelerator can be selected from the class of substituted aromatic amines such as, e.g., dimethylaniline, diethylaniline, dimethyl-p.toluidine, or from the class of cobalt and/or vanadium and/or manganese salts of organic acids, such as, e.g. cobalt octanoate, vanadium 2-ethylhexanoate, etc., or from mixtures of the two classes. A preferred accelerator is constituted by the commercial product ERGONAL R, containing vanadium 2-ethylhexanoate, and manufactured by PENNWALT.

The inhibitor can be selected from the class of hindered phenols, such as, e.g., tert.butyl-catechol, ditert-.butyl-p-cresol, and so forth. A preferred inhibitor is constituted by a mixture of these two derivatives and is marketed under the tradename LUCHEM IN 5 by PENNWALT. Such products are used in mixture with the resin at a level of 0.1–0.6% by weight respectively.

The reinforcement operation is carried out by means of the contemporaneous deposition of polyester resin and of fiberglass, carried out by hand-operated guns, or, preferably, by using a robotized system. The hardening times are suitably adjusted by means of the accelerator/inhibitor system as a function of the type of sheet to be reinforced.

Typical hardening times for the sheets constituted by polymethylmethacrylate are of the order of 4–5 minutes.

The increase in volume due to the foaming can be comprised within the range of from 10 to 200% of the initial volume, and is preferably around 100%.

The reinforcement can also be applied by other technologies, such as, e.g., the RIM (Reaction Injection Molding) technology, the LPM (Low Pressure Molding) technology, and possibly also by casting or manual lamination. The processes presently preferred are the spray process and the RIM process.

The sheets of acrylic or methacrylic resin used in practicing the present invention can be of different types. There can be used: case sheets, extruded sheets obtained with polymethylmethacrylates having characteristics corresponding to ISO DIS 8257/½ Standard, or co-extruded sheets consisting of two or more layers, wherein the layer in contact with water is generally polymethylmethacrylate or shock-resistant polymethylmethacrylate, modified with such acrylic rubbers as, e.g., the rubbers based on butyl acrylate and styrene, while the other layer(s) can be of shock-resistant polymethylmethacrylate, ABS, MBS, etc.

In addition to the advantages of industrial character as already illustrated herein, the method of the present invention allows a substantial improvement to be obtained in the quality of sanitary wares produced. In particular, the superficial appearance is improved of the reinforcing layer, which coats the fiberglass to a more complete extent, preventing it from appearing at the article's surface. This is not only a fact of aesthetic character, but allows also a considerable improvement in the handiness of the articles to be achieved.

Another improvement is the reduction of the weight of the articles, with the stiffness being the same, which represents a saving in terms of raw materials, and furthermore, allows a better heat insulation, with consequent greater comfort for the user.

These advantages cause the articles manufactured according to the present invention to constitute, per se, an improvement relatively to the corresponding products of the prior art.

The following examples are given to illustrate the present invention in more detail and are not intended to be limiting.

EXAMPLE 1

According to the known art, there is thermoformed a coextruded sheet of 5 mm of total thickness, constituted by a layer of polymethylmethacrylate (Vedril S.p.A., granules 9K) in accordance with ISO DIS 8257/½ Standard (thickness of about 4 mm) and by a layer of shock-resistant modified polymethylmethacrylate (Vedril granules 18 V) having a thickness of about 1 mm, until a thermoformed shell having the shape of a bathtub of approximate dimensions 1810×810×590 mm is obtained. The thermoplastic shell is reinforced by the spraying of polyester resin type "Syrester 3320" (product by the firm SIR) and fiberglass cut to staple of 1–2 cm in length, with a resin: fiberglass weight ratio of 85:15, and to a thickness of about 3 mm on the vertical walls and of about 5 mm on the bottom. The resin applied on the bottom embeds a panel of rigid polyurethane of 0.3 g/cm$^3$ in specific gravity and of size corresponding to the bathtub bottom, and of 2 cm in thickness, applied as a further stiffening means. Resin Sirester 3320 is mixed, before being sprayed, with the foaming agent Superfoam 329 manufactured by PENNWALT, Buffalo, N.Y., to a concentration of 1.25 parts by weight per 100 parts of resin, and with 0.2 parts by weight percent of an accelerator agent (ERGONAL L).

The catalyst Luperox DP 33, manufactured by PENNWALT LUCIDOL DIVISION, is added to the resin at the time of spraying to a concentration of 3% by weight. The resin sets within about 4 minutes, with an exothermic peak of 48° C.

The reinforced bathtub is trimmed and is subsequently submitted to the tests according to the C.E.N. p.a. EN 198, part 1, Standard draft. It results that the bathtub meets all the prescriptions of the Standard.

The temperature cycle tests according to the above mentioned Standard draft (§3.2.2, test "b") are continued for a further 400 cycles. After a total of 500 cycles, the bathtub does not show any faults.

The bathtub is weighed, and a total weight of 16 kg is found, as compared to a weight of 20 kg of an identical bathtub coated with non-foamed fiberglass-reinforced polyester resin (of 3–4 mm in thickness).

After the temperature cycle tests, the bathtub is sectioned lengthwise, and the reinforcing layer is carefully examined.

It does not show any signs of peeling, nor does it show cavities. The specific gravity measured on samples of the reinforcing layer is 0.9 g/cm$^3$ on the average.

A sharp wedge forcedly applied in correspondence of the junction area between the acrylic sheet and the reinforcing layer is not capable of causing a separation at the interface, but, on the contrary, causes a breakage in the polyester layer.

From a vertical wall of the bathtub, 12 specimens of size 120×10 mm are cut. On them, with supports positioned at a distance of 100 mm, low-speed (5 mm/minute) measurements are carried out of flexural stiffness, values comparable to those of an identical bathtub reinforced according to the technique known from the prior art being obtained: 23.3 N/mm for the specimen reinforced with foamed polyester, 19.2 N/mm for the specimen reinforced according to the prior art.

Heat conductivity tests are carried out on panels of 100×100 mm drawn off from the side walls. The data is on the average lower by 40% than of the analogous specimens drawn off from a bathtub reinforced according to the prior art: 0.095 kcal/m.h.°C. in case of a specimen reinforced with foamed polyethylene, 0.14 kcal/m.h.°C. in case of a specimen in accordance with the prior art.

EXAMPLE 2

A co-extruded sheet as in Example 1 is thermoformed to the shape of a shower tray having the dimensions 750×750×200 (mm) and reinforced with the modalities of Example 1, but with a thickness of the reinforcing layer of 4 mm and without inserting the polyurethane panel.

The article so manufactured passes the tests prescribed by the European Standard for the shower trays.

We claim:

1. A sanitary ware comprised of a first layer of at least one sheet of a thermoformed acrylic or methacrylic resin, and a reinforcing layer of a foamed, fiberglass-filled unsaturated polyester resin bonded to said first layer, said thermoformed resin being contacted by water when said sanitary ware is in use.

2. The sanitary ware of claim 1 wherein the thermoformed resin is polymethylmethacrylate.

3. The sanitary ware according to claim 1 wherein said first layer is a cast sheet or extruded sheet, or co-extruded sheets consisting of at least two sheets wherein a first sheet of said co-extruded layer is the water contact layer and is selected from polymethylmethacrylate and shock-resistant polymethylmethacrylate, and said additional sheets are selected from shock-resistant polymethylmethacrylate, ABS and MBS.

4. The sanitary ware according to claim 1 wherein the fiberglass/polyester resin ratio is comprised within the range of from 10/90 to 40/60.

5. The sanitary ware according to claim 4 wherein the fiberglass/polyester resin ratio is from 15/85 to 25/75.

6. A method of making a sanitary ware comprising:
thermoforming a sheet of an acrylic or methacrylic resin, and then
spraying a reinforcing layer of foamed unsaturated fiberglass filled polyester resin onto a back of said thermoformed sheet.

7. The method of claim 6 which further comprises heating said sheet prior to thermoforming; setting said fiberglass filled polyester resin, and then trimming said ware to produce a commerical product.

* * * * *